June 15, 1937.   P. W. CRANE ET AL   2,083,557
EXTRUSION APPARATUS
Filed April 27, 1935   3 Sheets-Sheet 2

Paul W. Crane   INVENTORS
Reuben T. Fields
BY
ATTORNEY.

Paul W. Crane  INVENTORS
Reuben T. Fields

Patented June 15, 1937

2,083,557

UNITED STATES PATENT OFFICE 2,083,557

EXTRUSION APPARATUS

Paul W. Crane, Montclair, and Reuben T. Fields, Arlington, N. J., assignors, by mesne assignments, to E. I. du Pont de Nemours & Company, Wilmington, Del., a corporation of Delaware Application April 27, 1935, Serial No. 18,681

6 Claims. (Cl. 18—15)

This invention relates to an extrusion apparatus and, more particularly, to an apparatus for extruding a plastic in sheet form, said apparatus having means for accurately measuring the caliper of the extruded sheet and means for controlling the caliper of the sheet as it is extruded. The invention relates particularly to such apparatus adapted to extrude a plastic in a continuous web or sheet.

Heretofore sheets of plastic material have been made by extruding plastic in a more or less dough-like state under pressure through a slit-like orifice; as a matter of efficiency and economy, this is usually done as a continuous operation to give a long web of plastic which is subsequently cut into desired lengths. The production of sheets of cellulose derivative plastic, i. e., cellulose nitrate and acetate, has been carried out in this way. In Crane & Fields U. S. Patent 1,956,564, patented May 1, 1934, is fully disclosed the extrusion of a continuous sheet or web of cellulose ester plastic, the plastic being rather soft as extruded and being conducted into a liquid bath to remove solvent and make the sheet firmer and more solid. Plastics may be extruded into air instead of a liquid bath, depending on evaporation of solvent to make the sheet solid. Also, heating the plastic before extrusion and extruding into a cold atmosphere tends to give the extruded sheet the requisite firmness to be handled further. Other types of plastic may be worked in this general manner.

The manufacture of sheets by extrusion has involved a serious problem in so far as getting a finished sheet of uniform caliper, i. e., thickness, is concerned. This is particularly true where the sheeting is to be used as an interlayer in safety glass, since satisfactory production and functioning of safety glass requires sheeting that closely approaches perfect uniformity of caliper over the entire area of the safety glass.

The caliper of extruded sheets is influenced by a number of factors such as the width of the slit-like orifice through which the plastic is extruded, the consistency of the plastic, the pressure under which it is extruded, and the temperature of the plastic as it is extruded, which influences the consistency.

Heretofore it has been usual to form the slit-like orifice for the extrusion of the sheet by the use of rigid metallic jaws to control the caliper of the sheet by simple adjustment of the two jaws towards or away from each other. This has been found unsatisfactory because the fabrication of rigid metallic jaws of mathematically correct linearity and the mounting of them in completely parallel relationship is extremely difficult because of the length of the jaw members required for an extrusion orifice to make sheets of great width, because of the difficulty of originally machining such parts to the necessary accuracy, because of the temperature influences to which the jaws are exposed in service which tend, through causing expansion, to warp the jaws out of complete linearity and parallelism, and because of the tendency of the pressure of the plastic to spread the jaws apart.

A further factor contributing to non-uniformity of caliper of the extruded sheet, even assuming the orifice itself to be geometrically perfect, is a lack of uniformity in the consistency of the plastic and in the effective pressure upon the plastic across the full width of the orifice. Also it is difficult to avoid differences in temperature of the plastic across the entire width of the orifice and a zone of lower temperature, for example, results in a local stiffening of the dough thereby causing a lower rate of extrusion and local reduction in the caliper of the sheet.

An object of the present invention is to provide in an extrusion apparatus means for accurately controlling the caliper of the extruded sheet. A further object is to provide such means which will permit inequalities in pressure upon the plastic being extruded or in the consistency of the plastic, to be accurately compensated and thus avoid effecting irregularities in the caliper of the extruded sheet, as heretofore has been practically unavoidable. A further object of the present invention is to provide means in such an apparatus for accurately measuring the caliper of the extruded sheet so that immediate adjustment of the means for controlling the caliper of the sheet may be made if it appears that the extruded sheet is showing irregularities in caliper or thickness. A still further object of the invention is to provide such means for measuring the caliper of the extruded sheet whereby irregularities of caliper can be promptly detected with ease and simply corrected with a minimum loss of material. Other objects will be apparent from the description of the invention given hereinafter.

The above objects are accomplished according to the present invention by providing in an apparatus for extruding plastic in sheet form the combination of a slit-like orifice through which the pastic is extruded, a plurality of means for controlling the caliper of the sheet at spaced intervals across its width as it is extruded, and a plurality of means for measuring the caliper of the extruded sheet at spaced intervals across its width. Preferably the controlling means and measuring means are arranged to correspond in number and position across the width of the extruded sheet so that irregularities of caliper indicated by a certain measuring means may be immediately adjusted by manipulation of the corresponding controlling means.

More specifically, the invention comprises in an apparatus for extruding plastic in sheet form, the combination of a slit-like orifice through which the plastic is extruded, said orifice comprising a fixed lower jaw and an adjustable upper jaw, said jaws being substantially straight and parallel, and a plurality of adjusting bolts connected to the upper jaw at spaced intervals throughout its length and adapted to control the distance between upper and lower jaws at spaced points across the width of the orifice whereby the caliper of the sheet can be controlled at a plurality of points across its width as it is extruded. Positioned parallel to and in front of the orifice a distance only sufficient for the sheet being extruded to become fairly firm, is a fixed straight edge over which the sheet is passed and on which the sheet bears. A rigid cross member is mounted above and parallel to said straight edge and carries a plurality of individual rockers which are pivotally mounted with their axes parallel to the straight edge and are positioned so as to bear lightly on the sheet as it passes over said straight edge. These individual rockers, which preferably correspond in number and relative position across the width of the sheet with the adjusting bolts connected to the upper jaw of the orifice, are connected with some means for indicating the angular movement of the rockers caused by variations in the caliper of the sheet passing between the straight edge and the rockers. In such an apparatus it will be seen that observation of the indicating means will instantly show if some irregularity in the caliper of the sheet being extruded is occurring and this irregularity can be immediately adjusted by manipulation of the adjusting bolt or bolts corresponding to the rockers which have indicated the irregularity in caliper.

In order to more fully understand the invention, reference is made to the accompanying drawings in which.

Figure 1:
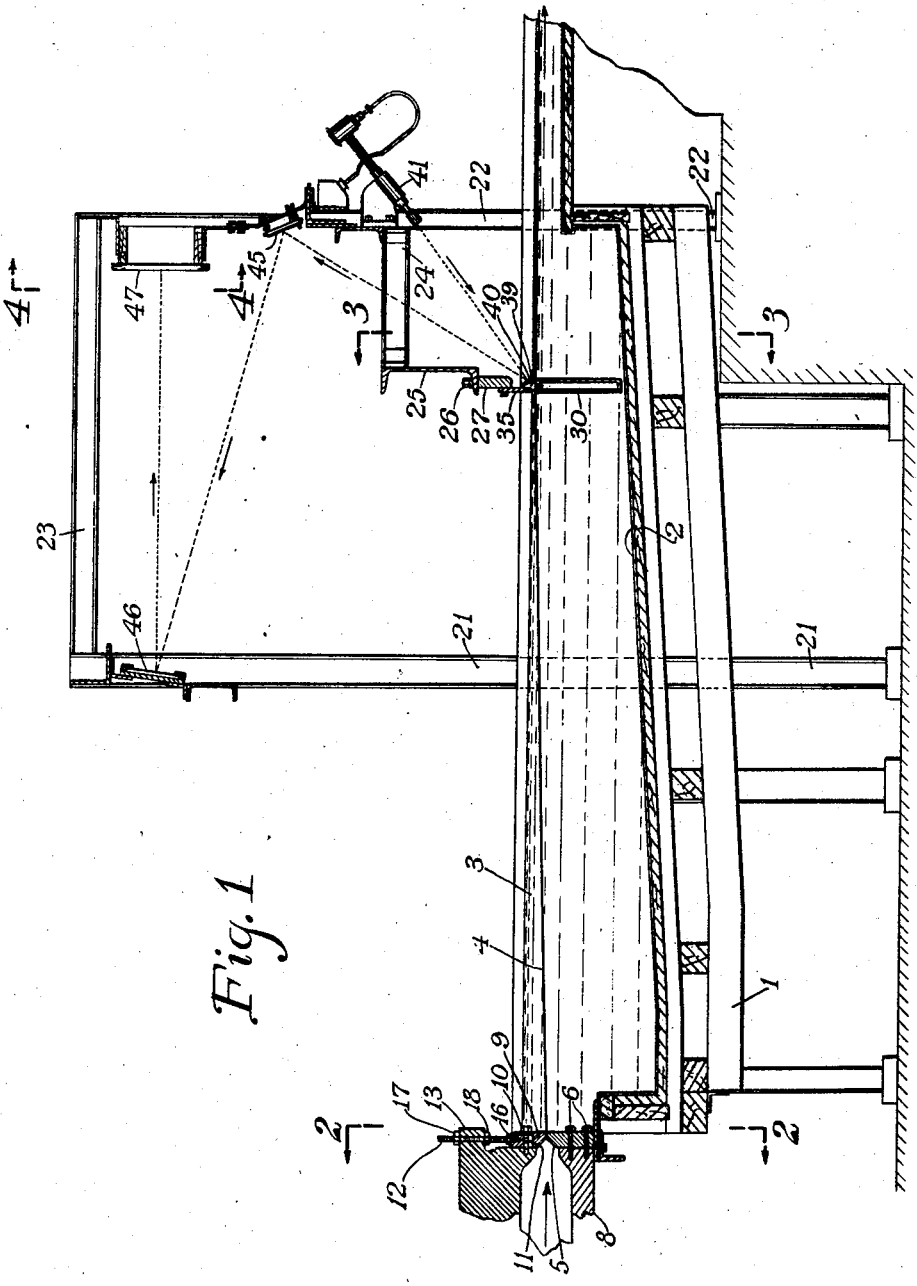
Fig. 1 is a vertical section of an apparatus according to the present invention, parts being broken away where unnecessary to the understanding of the invention.

Referring particularly to Fig. 1, there is illustrated an apparatus adapted to extrude a plastic in sheet form continuously; parts not pertaining to the invention have been broken away and it is to be understood that means for extruding the plastic under pressure through the extrusion orifice to be described, would be provided and that the extruded sheet after passing through the seasoning bath illustrated would be subsequently passed through other baths, drying chambers, and the like as the particular process used might require.

Figure 2:
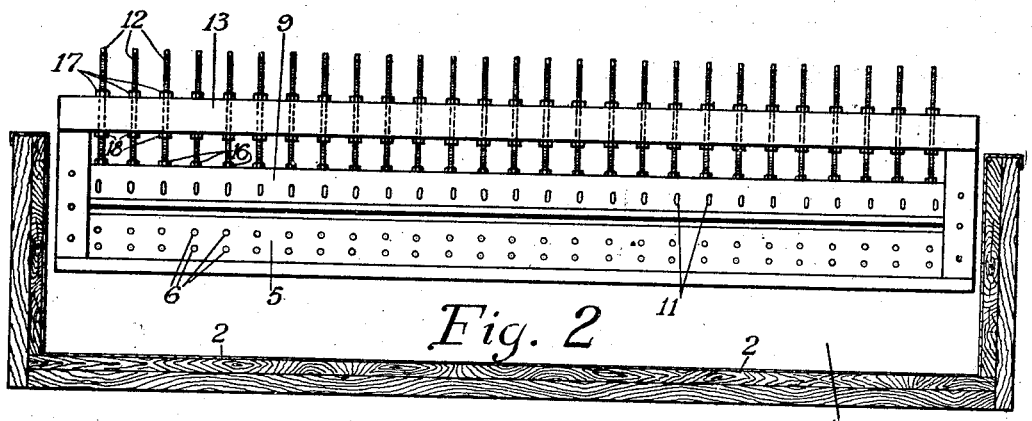
Fig. 2 is an elevation in the direction of arrows 2—2 of Fig. 1.

Reference numeral 1 indicates generally a frame work carrying the so-called seasoning tray 2 containing the liquid bath 3 adapted to remove solvent from the sheet 4 which is extruded directly into the bath and travels in the direction indicated by the arrows. This frame work 1 is also connected to the slit-like extrusion orifice on the left-hand side of the seasoning tray 2, looking at Fig. 1. This orifice comprises a straight rigid metallic lower jaw 5 mounted by a plurality of bolts 6 in fixed position on the lower part of the container 8 which holds the plastic to be extruded. The upper jaw 9 of the orifice is held adjacent the upper portion of the container 8 by means of a plurality of bolts 10 passing through the vertical slots 11 in the jaw member 9. The vertical slots 11 are more clearly illustrated in Fig. 2 where the bolts 10 have been omitted for purposes of illustration. The upper jaw member 9 is adapted to be vertically adjusted at a plurality of spaced intervals throughout its length by means of the bolts 12 screwed into the upper surface of the jaw 9 and passing through drilled holes in the portion 13 of the container 8. Nut 16 locks the bolts 12 with respect to the jaw 9 whereas nuts 17 and 18 control the relation of the bolts 12 with respect to the portion 13 of the container 8.

The orifice above described comprises the lower jaw 5 which is rigid and remains in a fixed position and the upper jaw 9 which may be adjusted vertically by means of the bolts 12 and nuts 17 and 18. It will be understood that, although the upper jaw 9 is preferably a substantially rigid metal bar, in an extrusion orifice of 6 feet in width, or so, the vertical distance between the upper jaw 9 at any particular point and the lower jaw 5 may be varied by manipulation of the adjusting bolt 12 at that point along the jaw 9. By this construction there is provided means of controlling the caliper of the sheet as it is extruded at a plurality of spaced intervals across the width of the orifice. If the caliper of the sheet being extruded is too great toward one side, the bolts 12 and nuts 17 and 18 which control the position of the bolts 12 may be adjusted to force down the jaw 9 at that point and thus correct the irregularity in caliper. If desired, the bolts 10 passing through the vertical slots 11 of jaw 9 may normally be tightened up so that it is necessary to loosen them before attempting to adjust vertically any portion of the jaw 9. As a practical matter, it has been found sufficient to have the bolts 10 merely drawn up sufficiently tight to hold the jaw 9 against the adjacent face of the container 8 but still not so tight as to prevent vertical adjustment of the jaw 9 through the bolts 12.

The means for measuring the caliper of the extruded sheet is carried on a separate frame independent of the frame work 1, in order to avoid vibration that might result from the extrusion of the plastic. This frame comprises four uprights, two of which are shown in Fig. 1 and are designated by the reference numerals 21 and 22 and connecting angle irons 23 only one of which is shown. Bolted to upright 22 is the horizontally extended arm 24 which carries a cross channel member 25 supported at the opposite end by another extending arm similar to 24. Fastened to channel member 25 by bolts 26 (see Figs. 1, 3, and 5) is a rigid cross member 27 which is positioned at right angles to the path of travel of the extruded sheet. By means of the differential screws 28 and 29 and associated nuts, the cross member 27 carries the rigid straight edge 30, parallel thereto and supported therefrom vertically a distance which can be accurately adjusted by means of the differential screws 28 and 29 (see Fig. 3). By referring to Fig. 1, it will be noted that the straight edge 30 is positioned within the seasoning tray 2, although supported independently thereof, in front of and parallel to the jaws 5 and 9 forming the extrusion orifice and hence at right angles to the path of travel of the extruded sheet 4 which passes over it and bears on it. The height of the straight edge may be varied but, where a seasoning bath is employed, it is preferred to have the top of the straight edge slightly below the level of the bath, as illustrated in Fig. 1.

Figure 3:
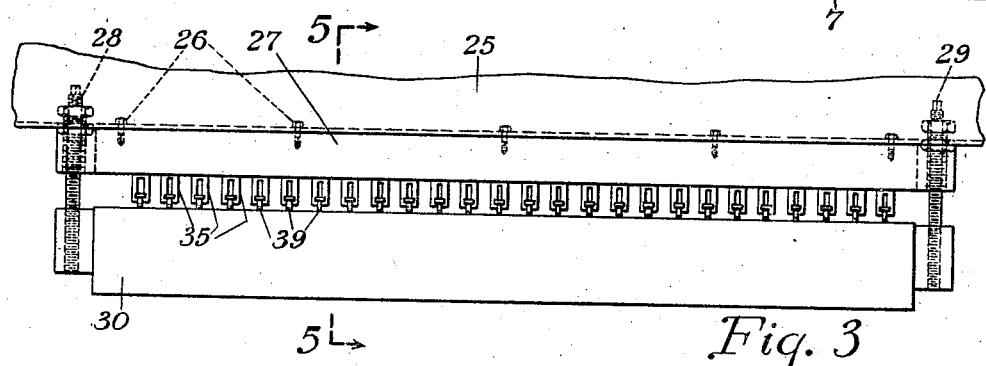
Fig. 3 is an elevation in the direction of arrows 3—3 of Fig. 1.
Figure 5:
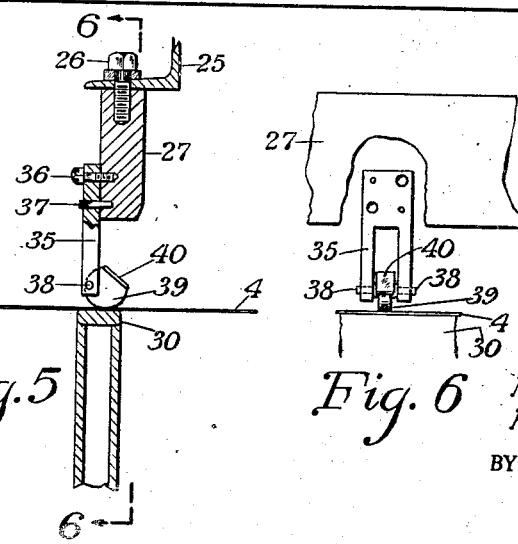
Fig. 5 is an enlarged section on the line 5—5 of Fig. 3.
Figure 6:
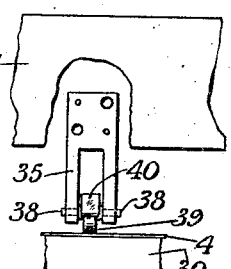
Fig. 6 is an elevation in the direction of the arrows 6—6 of Fig. 5.

Referring now more particularly to Figs. 3, 5, and 6, the cross member 27 has a series of depending bifurcated brackets 35 rigidly attached thereto by bolts 36 and pins 37. The brackets 35 are provided with bearings to receive the pins 38 of the rockers 39. These individual rockers 39 are free to pivot on the axes formed by their pins 38, the axes being off center so that the rockers are, in effect, individual cams or levers. The mounting of the rockers 39 is such that they bear lightly on the sheet 4 as it passes over the straight edge 30 and, of course, the individual rockers are given a certain angular movement about their axes by irregularities in caliper of the sheet 4 passing beneath them.

The angular movement of the rockers is indicated by mounting on each a plane reflecting surface or mirror 40 and providing a light projecting means 41 for each rocker. One of the light projecting means 41 is conventionally illustrated in Fig. 1, being mounted on the separate frame carrying the measuring assembly. As shown by the dotted line in Fig. 1, the light projecting means 41 projects a ray of light against the reflecting surface 40 on rocker 39, which ray is then reflected to mirror 45, then to mirror 46, and finally to the horizontal screen or panel 47. The mirrors 45 and 46 and screen 47 extend entirely across the width of the sheet 4 and receive and/or reflect all of the individual rays reflected from the various rockers 39; the mirrors 45 and 46 and screen 47 are rigidly mounted on the frame carrying the measuring assembly and are all parallel to each other, the straight edge 30, and the line of rockers 39, i. e., at right angles to the path of travel of the sheet 4. The angle of mirrors 45 and 46 is adjusted so that the ray of light reflected from a rocker bearing on a portion of the sheet 4 of correct caliper will be reflected from mirror 46 horizontally to the vertical center of screen 47.

Figure 4:
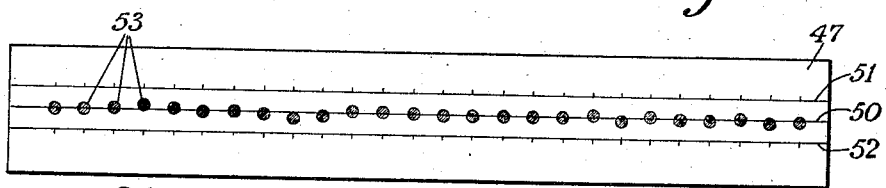
Fig. 4 is an elevation in the direction of arrows 4—4 of Fig. 1.

In Fig. 4 is illustrated a preferred form of screen 47 which is particularly convenient. The screen may be a painted board, or metal, or ground or frosted glass, in which latter case the spots of light falling thereon will be visible from either front or rear. The screen 47 is provided with a center horizontally ruled line 50 and upper and lower parallel ruled lines 51 and 52, respectively. Each ray or beam of light reflected from rockers 39 will form a bright round spot 53 on screen 47. By proper adjustment of the distance between the straight edge 30 and the rigid cross member 27 carrying rockers 39, and adjustment of the angular relationship of mirrors 45 and 46, the row of spots 53 can be made to fall exactly on the line 50 on screen 47 when a section of sheet 4 of perfectly uniform and desired caliper across its width is between rockers 39 and straight edge 30. When the apparatus is in operation and the sheet 4 moving through the seasoning tray 2, the operator can tell instantly by glancing at screen 47 whether the sheet is of uniform and desired caliper. Variations in caliper of sheet 4 passing under rockers 39 will throw one or several spots 53 above or below the line 50 indicating to the operator that sheet 4 is being extruded too thick or too thin at certain points across its width. The angular movement of the rockers is greatly magnified by the time the ray or beam of light strikes the screen 47.

As soon as a variation in caliper of sheet 4 is signaled to the operator, adjustment of the extrusion orifice is made by suitable manipulation of the adjusting bolts 12 and associated nuts to alter the distance between the adjustable jaw 9 and the fixed jaw 5 of the orifice at various local points. To facilitate location of the particular bolts 12 to be manipulated, it is preferred to have the number of bolts 12 and rockers 39 correspond and also their relative positions across the width of the sheet 4. If desired, the spots 53 on screen 47 and the bolts 12 can be correspondingly numbered. In this manner, if the spot of light having a certain number shows on the screen 47 off the center line 50, the operator will know that the correspondingly numbered adjusting bolt 12 requires adjustment.

It is an obvious matter of economy to correct an improper variation in caliper of sheet 4 as soon as possible after it occurs; for this reason, it is desirable to place the straight edge 30, rockers 39 and associated parts, close to the extrusion orifice. On the other hand, even though the rockers 39 bear very lightly on sheet 4, it is desirable to allow the sheet to become relatively firm before passing under the rockers. Accordingly, the straight edge 30, rockers 39, and the like, are placed as near the extrusion orifice as can be safely done without danger of marring the extruded sheet.

The number of adjusting bolts or screws 12 and rockers 39 provided with any particular extrusion apparatus may be varied and will differ appreciably with extrusion orifices of different widths. For accurate control of the caliper of the extruded sheet, both the adjusting bolts or screws and the rockers should be closely spaced. A slight lateral shrinkage of the sheet develops between the time of its formation at the extrusion orifice and its passage through the measuring means and, therefore, the rockers are advantageously spaced slightly closer together than the adjusting bolts or screws.

Figure 7:
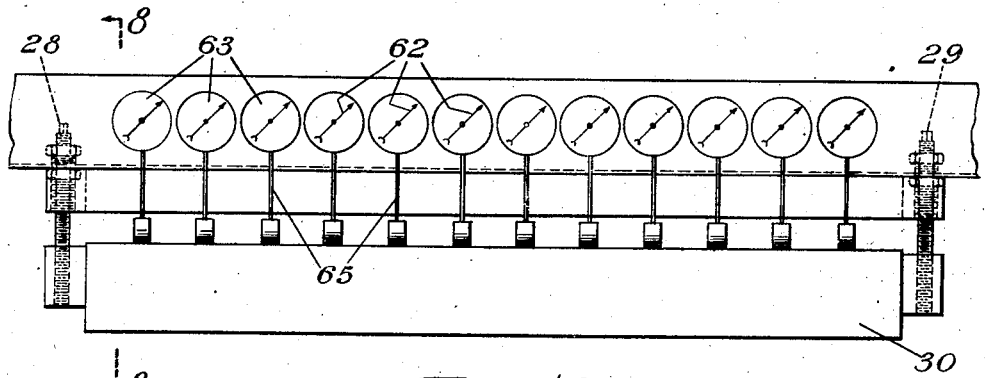
Fig. 7 is an elevation corresponding to Fig. 3 but illustrating a modified form of means for measuring the caliper of the extruded sheet.
Figures 8, 9:
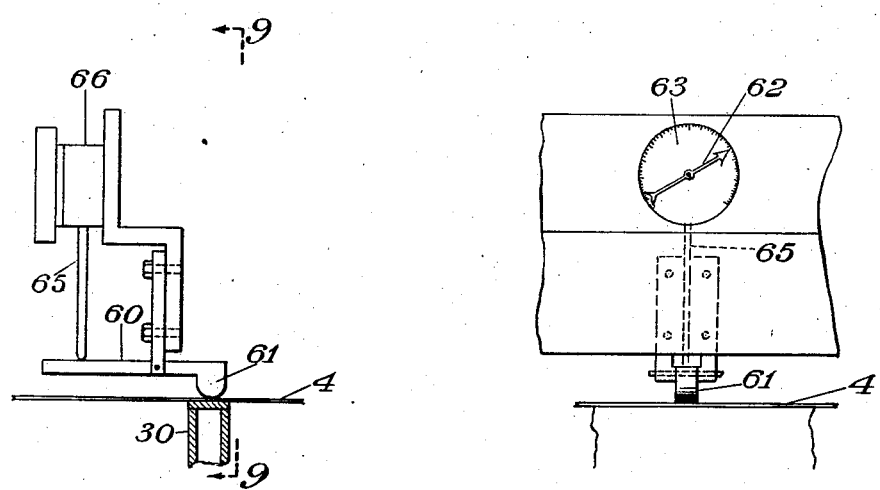
Fig. 8 is a section on the line 8—8 of Fig. 7.
Fig. 9 is an elevation in the direction of the arrows 9—9 of Fig. 8.

An alternative form of measuring means is illustrated in Figs. 7, 8, and 9, more or less diagrammatically. In this modification, the general location of the straight edge and mounting of the measuring device is similar to that already described. However, in place of rockers 39, rockers 60 of a modified design are used, these rockers 60 being in the form of relatively long levers pivoted by pins adjacent the end of the rocker carrying the enlarged section 61 which bears on the sheet 4. Angular movement of these rockers is indicated by the needle 62 of dial gauges 63 actuated by movement of the rocker 60 through the rod 65 and suitable gearing contained in the housings 66 which hold the dial gauges. The manner of using this form of indicating means is similar to the manner of using the reflected ray indicating means in principle, as will be understood by those skilled in the art. The operator reads the series of gauges rather than observing a row of light spots on a screen.

It will be understood that the invention is not limited to the particular apparatus herein illustrated but includes within its scope the various equivalent means of controlling the caliper of the sheet as it is extruded and equivalent means of measuring the caliper of the extruded sheet, such as will occur to those skilled in the art.

The use of a seasoning bath forms no essential part of this invention and will be used or omitted, depending upon the type of extrusion process being employed.

While the upper jaw of the orifice illustrated is stated to be relatively flexible, this merely means only flexible enough to permit adjustment by means of the adjusting bolts or screws. Actually, in an orifice 6 feet wide, or so, the upper jaw will comprise a substantially rigid piece of metal, solid nickel is suitable, and be similar to the lower jaw. The lower jaw of the orifice may be made adjustable instead of the upper jaw, or, if desired, both may be made adjustable.

In effect, the adjusting bolts or screws for controlling the extrusion orifice are substantially independent of each other in their action so that adjustment of one of them is effective only in the zone which it directly controls but, obviously, the stiffness of even a relatively flexible metal jaw member is sufficient to transmit the effect of an adjustment at one point slightly into the zones controlled by adjacent adjusting bolts or screws. This is highly desirable, since it militates against the development of sudden inequalities in thickness along the width of the sheet which inequalities are, for practical purposes, much more serious than gradual changes of even greater total magnitude.

Instead of employing the type of orifice herein illustrated to control the caliper of the sheet as extruded, other equivalent means may be employed. For example, the orifice may comprise a pair of fixed jaws which are not adjustable at a plurality of points across the orifice, and the caliper of the sheet as extruded may be controlled by using a plurality of vertically and independently adjustable restricting blocks, plungers, or the like, disposed in the container for the plastic adjacent and parallel to the orifice. Such restricting blocks, or the like, when lowered in the path of the plastic flowing toward the orifice will narrow the path vertically and tend to restrict the flow of plastic, consequently decreasing the caliper of the sheet as extruded at the particular zone where the block or blocks have been lowered. These restricting blocks will preferably correspond in number and relative position across the width of the orifice to the number and relative position of the rockers across the width of the extruded sheet in order to facilitate corrections of irregularities in caliper of the sheet noted by the indicating means controlled by the rockers. Adjustment of the caliper of the sheet would be effected, in principle, in the same manner as when using the adjusting bolts illustrated.

Other means for controlling the caliper of the sheet as extruded, at a plurality of spaced points across the width of the extrusion orifice, may be employed as will be understood by those skilled in the art. Such means include not only physical obstructions in the path of the plastic being extruded but also means regulating the pressure on the plastic, or the temperature of the plastic, at a number of points across the width of the orifice.

The plurality of means for measuring the caliper of the extruded sheet may be varied considerably. It is preferred to have the individual rockers which are, in effect, cams or levers, mounted on a single rigid cross member positioned above and parallel to the straight edge over which the extruded sheet passes. This is a matter of convenience in adjusting the distance between all of the rockers simultaneously and the straight edge. However, the rockers may be mounted for individual adjustment and, as a practical matter, it is convenient to have the rockers individually adjusted although, at the same time, carried by a rigid cross member. The use of other indicating means actuated by the angular movement of the rockers is, of course, obvious, the light projecting means merely illustrating a particular modification which has been found highly successful in practice.

The rockers employed must be made of material which will not be corroded by any liquid bath in which they are immersed. Salt brine is usually used as the liquid bath for seasoning the sheets and the rockers may be advantageously made of nickel which resists the corrosion of the brine bath. The rockers are preferably of a light construction consistent with adequate rigidity, and so balanced that their weight upon the sheet passing beneath them, while sufficient to maintain accurate contact therewith, is not great enough to produce any permanent indentation on the sheet.

An advantage of the present invention is that it provides an apparatus capable of producing extruded sheets having the greatest uniformity of caliper. A further advantage is that the apparatus allows the prompt detection of slight variations in caliper of the extruded sheet and the immediate correction thereof with a minimum amount of labor and attention by the operator.

As many apparently widely different embodiments of this invention may be made without departing from the spirit and scope thereof, it is to be understood that the invention is not limited to the specific embodiments thereof except as defined in the appended claims.

We claim:

1. In an apparatus for extruding plastic in sheet form, the combination comprising a slit-like orifice through which the plastic is extruded, a plurality of means for controlling the caliper of the sheet at spaced intervals across its width as it is extruded, a fixed straight edge positioned parallel to and in front of said orifice over which edge the sheet passes and on which the sheet bears, a plurality of individual rockers pivotally mounted above said straight edge with their axes parallel to said straight edge, said rockers being positioned so as to bear lightly on the sheet as it passes over said straight edge, and means for indicating the angular movement of each rocker about its axis caused by variations in the caliper of the sheet passing between the straight edge and the rockers.

2. In an apparatus for extruding plastic in sheet form, the combination comprising a slit-like orifice through which the plastic is extruded, a plurality of means for controlling the caliper of the sheet at spaced intervals across its width as it is extruded, a fixed straight edge positioned parallel to and in front of said orifice over which straight edge the sheet passes and on which the sheet bears, a rigid cross member mounted for vertical adjustment with respect to said straight edge above and parallel to said straight edge, a plurality of individual rockers carried by said cross member, said rockers being pivotally mounted with their axes parallel to said straight edge and being positioned so as to bear lightly on the sheet as it passes over said straight edge, and means for indicating the angular movement of each rocker about its axis caused by variations in the caliper of the sheet passing between the straight edge and the rockers, the controlling means and the rockers corresponding in number and relative position across the width of the sheet.

3. In an apparatus for extruding plastic in sheet form, the combination comprising a slit-like orifice through which the plastic is extruded, a plurality of means for controlling the caliper of the sheet at spaced intervals across its width as it is extruded, a fixed straight edge positioned parallel to and in front of said orifice over which straight edge the sheet passes and on which the sheet bears, a rigid cross member mounted for vertical adjustment with respect to said straight edge above and parallel to said straight edge, a plurality of individual rockers carried by said cross member, said rockers being pivotally mounted with their axes parallel to said straight edge and being positioned so as to bear lightly on the sheet as it passes over said straight edge, plane reflecting surfaces mounted on said rockers, means for projecting parallel rays of light on said reflecting surfaces and a screen for catching the rays of light reflected from said reflecting surfaces whereby the angular movement of the rockers caused by variations in the caliper of the sheet passing between the straight edge and the rockers may be indicated, the controlling means and the rockers corresponding in number and relative position across the width of the sheet.

4. In an apparatus for extruding plastic in sheet form, the combination comprising a slit-like orifice through which the plastic is extruded to form a sheet, said orifice comprising a fixed lower jaw and an adjustable upper jaw, said jaws being substantially straight and parallel, a plurality of adjusting bolts connected to said upper jaw at spaced intervals throughout its length and adapted to control the distance between upper and lower jaws at spaced points across the width of the orifice whereby the caliper of the sheet can be controlled at a plurality of points across its width as it is extruded, a fixed straight edge positioned parallel to and in front of said orifice over which straight edge the sheet passes and on which the sheet bears, a plurality of individual rockers pivotally mounted above said straight edge with their axes parallel to said straight edge, said rockers being positioned to bear lightly on the sheet as it passes over said straight edge, and means for indicating the angular movement of each rocker about its axis caused by variations in the caliper of the sheet passing between the straight edge and the rockers, the number of rockers and their position across the width of the sheet corresponding with the number of adjusting bolts and their position across the width of the orifice.

5. In an apparatus for extruding plastic in sheet form, the combination comprising a slit-like orifice through which the plastic is extruded to form a sheet, said orifice comprising a fixed lower jaw and an adjustable upper jaw, said jaws being substantially straight and parallel, a plurality of adjusting bolts connected to said upper jaw at spaced intervals throughout its length and adapted to control the distance between upper and lower jaws at spaced points across the width of the orifice whereby the caliper of the sheet can be controlled at a plurality of points across its width as it is extruded, a fixed straight edge positioned parallel to and in front of said orifice over which straight edge the sheet passes and on which the sheet bears, a plurality of individual rockers pivotally mounted above said straight edge with their axes parallel to said straight edge, said rockers being positioned to bear lightly on the sheet as it passes over said straight edge, plane reflecting surfaces mounted on said rockers, means for projecting parallel rays of light on said reflecting surfaces, and a screen for catching the rays of light reflected from said reflecting surfaces whereby the angular movement of the rockers caused by the variations of the caliper of the sheet passing between the straight edge and the rockers may be indicated, the number of the rockers and their position across the width of the sheet corresponding with the number of adjusting bolts and their position across the width of the orifice.

6. In an apparatus for extruding plastic in sheet form, the combination comprising a slit-like orifice through which the plastic is extruded, a plurality of means for controlling the caliper of the sheet at spaced intervals across its width as it is extruded, a fixed straight edge positioned parallel to and in front of said orifice over which edge the sheet passes and on which the sheet bears, a plurality of independently movable members mounted above said straight edge and positioned so as to bear lightly on the sheet as it passes over said straight edge, and means for indicating the movement of each member caused by variations in the caliper of the sheet passing between the straight edge and the members.

PAUL W. CRANE.
REUBEN T. FIELDS.